(12) United States Patent
Willekes et al.

(10) Patent No.: US 6,516,434 B1
(45) Date of Patent: Feb. 4, 2003

(54) APPLICATION-SPECIFIC INTEGRATED CIRCUIT (ASIC) FOR USE IN COMMUNICATION FACILITIES OF A DIGITAL NETWORK

(75) Inventors: Elmar Willekes, Stuttgart (DE); Josef Stadlhofer, Fellbach (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/467,241

(22) Filed: Dec. 20, 1999

(30) Foreign Application Priority Data

Dec. 23, 1998 (DE) .......................................... 198 59 835

(51) Int. Cl.[7] .............................................. G01R 31/28
(52) U.S. Cl. ........................................ 714/738; 714/733
(58) Field of Search ................................. 714/710, 738, 714/7, 726, 728, 731, 733, 739, 744; 345/504

(56) References Cited

U.S. PATENT DOCUMENTS

| | | | |
|---|---|---|---|
| 5,577,050 A | * 11/1996 | Bair et al. ................... | 714/710 |
| 5,619,509 A | * 4/1997 | Maruyama et al. .......... | 714/707 |
| 5,764,657 A | * 6/1998 | Jones ........................... | 714/738 |
| 6,061,817 A | * 5/2000 | Jones et al. .................. | 714/738 |
| 6,065,134 A | * 5/2000 | Bair et al. .................... | 714/7 |
| 6,128,025 A | * 10/2000 | Bright et al. ................ | 345/504 |

OTHER PUBLICATIONS

Paul K. Sun and Greg Lowe, "XBERT—A Versatile 622 Mb/sec Bit Error Rate Generator/Receiver", Proceedings Sixth Annual IEEE International ASIC Conference and Exhibit, New York, USA 1993.

Dennis T. Kong, "2.488 Gb/s SONET Multiplexer/Demultiplexer with Frame Detection Capability", IEEE Journal on Selected Areas in Communications, vol. 9, No. 5, Jun. 1991.

* cited by examiner

Primary Examiner—David Ton
(74) Attorney, Agent, or Firm—Sughrue Mion, PLLC

(57) ABSTRACT

The invention relates to an application-specific integrated circuit (ASIC) (1) for use in communication facilities of a digital network in which a data signal to be transmitted is composed of frames. To improve such an integrated circuit (1) in such a manner that external testing devices for testing the performance of the integrated circuit (1) can be dispensed with, the invention proposes to provide the integrated circuit (1) with a circuit (4) for executing the ASIC functions and with a data test circuit (3) having first means (5) for generating a framed test signal (6) and second means (7) for detecting bit errors in a received test signal (8).

18 Claims, 2 Drawing Sheets

APPLICATION-SPECIFIC INTEGRATED CIRCUIT (ASIC) FOR USE IN COMMUNICATION FACILITIES OF A DIGITAL NETWORK

BACKGROUND OF THE INVENTION

This invention relates to an application-specific integrated circuit (ASIC) for use in communication facilities of a digital network wherein a data signal to be transmitted is composed of frames.

The invention also relates to a communication facility of a digital network comprising a plurality of application-specific integrated circuits, and to a digital network with communication facilities comprising a plurality of application-specific integrated circuits.

Integrated circuits of the above kind are known in the art in various forms. In one integrated circuit, for example, a switching matrix is implemented in which one or more inlets have access to one or more outlets. Such integrated circuits are used in communications systems for switching purposes, for example. One or more integrated circuits are commonly implemented on a single semiconductor chip that is used in a communication facility, e.g., a transmitter or receiver unit, of a communications network.

In prior-art communications networks, the data signals to be transmitted are usually composed of frames. A frame has an overhead section, containing a frame word for indicating the beginning of the frame, and a payload section. The overhead section contains the data to be transmitted. One example of a standard for the transmission of a data signal with such a frame structure is the synchronous digital hierarchy (SDH) standard. According to this standard, each frame is represented as a 9 row by 270 column matrix. The first 9 columns of the frame form the overhead section, and the remaining 261 columns form the payload section. The first row of the overhead contains the frame word, also referred to as the frame alignment word (FAW), which indicates the beginning of the frame.

With the aid of the frame word, a plausibility check can be performed on the transmitted data. If the frame word is not detected in two successive frames, the integrated circuit will stop the transmission of the data in the frames until it detects the frame word in two successive frames again. In addition, the frame word can be used to assign the data contained in the payload section to individual signal channels.

The frames are commonly transmitted at a frequency of 155 MHz (STM-1 frames). It is also possible to transmit the frames at 622 MHz (STM-4 frames) or 2.4 GHz (STM-16 frames).

In the prior art, the performance of such integrated circuits is tested by means of external testing devices. These testing devices incorporate, for example, a signal generator for generating a test signal and a device for measuring a test signal and detecting bit errors. The testing devices may also be implemented on semiconductor chips that are disposed within the communication facility separately from the integrated circuits of the communication facility. These testing devices implemented on semiconductor chips are connected to the integrated circuits of the communication facility. Such a testing device is described, for example, in an article by Paul K. Sun and Greg Lowe, "XBERT—A Versatile 622 Mb/sec Bit Error Rate Generator/Receiver", Proceedings Sixth Annual IEEE International ASIC Conference and Exhibit New York, N.Y., USA, 1993.

The testing device disclosed therein processes test signals that are composed of frames. The test signals are used to test the performance of semiconductor circuits that can only process data signals composed of frames. In an article by Dennis T. Kong, "2.488 Gb/s SONET Multiplexer/Demultiplexer with Frame Detection Capability", IEEE Journal on Selected Areas in Communications, Vol. 9, No. 5, June 1991, an optical transmission network is described in which the data signal to be transmitted is composed of frames. The article describes various framing methods.

The prior-art integrated circuits have the disadvantage of requiring external testing devices for making performance tests.

SUMMARY OF THE INVENTION

It is therefore an object of the present invention to improve an integrated circuit of the above kind in such a way that external testing devices for testing the integrated circuit can be dispensed with.

To attain this object, the invention provides an integrated circuit of the above kind which is characterized in that it comprises a circuit for executing the ASIC functions and a data test circuit having first means for generating a test signal composed of frames and second means for detecting bit errors in a received test signal.

The integrated circuit according to the invention includes a circuit for executing the ASIC functions. This circuit executes the functions of conventional ASICs as are known from the prior art. The integrated circuit according to the invention further includes a data test circuit. By means of the data test circuit, the performance of the circuit for executing the ASIC functions or of the entire integrated circuit can be tested quickly and easily without additional testing devices. In this way, the cost and complexity of the performance test of an integrated circuit can be significantly reduced.

The testing of the integrated circuit can take place prior to the start-up of the communication facility containing the integrated circuit or, at no major additional cost, during the operation of the communication facility. This makes it possible to monitor the integrated circuit on-line or at least at arbitrary instants during the operation of the communication facility.

The additional costs of the data test circuit incorporated in the integrated circuit according to the invention are considerably lower than the costs of a separate testing device as is known from the prior art. Also, the cost of the design and layout of the integrated circuit incorporating the data test circuit is considerably lower than the cost of testing the performance of an integrated circuit by means of a separate testing device.

The data test circuit of the integrated circuit according to the invention generates a test signal composed of frames. This makes it possible to test the performance of such integrated circuits, which use data signals composed of frames, quickly and in a simple manner.

If the data test circuit is of a suitable design, the integrated circuit according to the invention can also be used to test the entire superordinate circuit of a communication facility, which incorporates the integrated circuit. To accomplish this, in a preferred embodiment of the invention, the first means of the data test circuit are connected to at least one output of the integrated circuit. The first means generate a framed test signal which is passed through the output section of the superordinate circuit. At the output of the superordinate circuit, the test signal is then fed to an external measuring device or the like which compares the received test signal with a reference signal. The reference signal corresponds to an error-free test signal. In this way, the output section of the superordinate circuit can be tested.

In another preferred embodiment of the invention, the second means of the data test circuit are connected to an input of the integrated circuit. According to this embodiment, a framed test signal can be generated by an external signal generator, for example. The test signal is applied to the input of the superordinate circuit and passes through the input section of the latter to the second means of the data test circuit of the integrated circuit which is incorporated in the superordinate circuit. In the second means, the received test signal is compared with a reference signal corresponding to an error-free test signal. In this way, the input section of a superordinate circuit can be tested.

It is also possible, however, to couple the output of the superordinate circuit externally to the input of the superordinate circuit. Then, the test signal generated by the first means of the data test circuit is passed through the output section of the superordinate circuit to the output, from there to the input, and then through the input section of the superordinate circuit to the second means. In this way, the input section and the output section of a superordinate circuit can be tested by the integrated circuit according to the invention.

If, for example, a switching matrix in which one or more inlets have access to one or more outlets is implemented in the circuit for executing the ASIC functions, it is possible to connect the first outlet of the switching matrix externally to the first inlet, the second outlet to the second inlet, etc., so that each outlet of the switching matrix is connected to a respective one of the inlets. Furthermore, the switching matrix is set so that the first inlet is connected to the second outlet, the second inlet to the third outlet, etc. If the first means of the data test circuit are then connected to the first outlet of the switching matrix, and the second means of the data test circuit are connected to the last inlet of the switching matrix, a test signal generated by the first means will pass through the entire switching matrix to the second means. In this way, the entire switching matrix can be tested in a rapid and simple manner.

If the integrated circuit has a plurality of inputs, it should be possible to switching from any of the inputs to the data test circuit. Therefore, in a further preferred embodiment of the invention, the integrated circuit comprises a first multiplexer having its inputs connected to the inputs of the integrated circuit and having its output coupled to the second means of the data test circuit.

If the integrated circuit has a plurality of outputs, it should be possible to switch for any of the outputs of the integrated circuit from the outputs of the circuit for executing the ASIC functions to the output of the data test circuit. Therefore, in a further preferred embodiment of the invention, the integrated circuit comprises a plurality of further multiplexers each having one of its inputs connected to the first means and another input to one output of the circuit for executing the ASIC functions and having its output coupled to a respective one of the outputs of the integrated circuit.

In still another preferred embodiment of the invention, the first means of the data test circuit are connected to at least one input of the circuit for executing the ASIC functions, and the second means of the data test circuit are connected to at least one output of the circuit for executing the ASIC functions. This enables the data test circuit of the integrated circuit according to the invention to test the performance of the circuit for executing the ASIC functions directly, i.e., without externally short-circuiting the outputs of the integrated circuit to the inputs of the integrated circuit or without passing the test signals through a superordinate circuit incorporating the integrated circuit.

In a further preferred embodiment of the invention, the data test circuit is synchronized with the circuit for executing the ASIC functions. The data test circuit may operate at the same clock rate as the circuit for executing the ASIC functions. It is also possible, however, that a bit timing signal of the circuit for executing the ASIC functions is converted to a nibble timing signal or a byte timing signal of the data test circuit.

In yet another preferred embodiment of the invention, the frames of the data signal to be transmitted and of the test signal are structured according to the synchronous digital hierarchy (SDH) standard and have an overhead section, containing a frame word indicating the beginning of a frame, and a payload section.

External testing devices are known which comprise a signal generator for generating a framed test signal according to the SDH standard and a measuring device for measuring a framed test signal according to the SDH standard. Such an external signal generator could, for example, generate a test signal and apply it to the input of the integrated circuit, which test signal could then be received and checked for bit errors by the second means of the data test circuit. Likewise, the first means could generate a test signal and transfer it to the output of the integrated circuit, which test signal could then be received and checked for bit errors by the external measuring device. The use of standardized test signals has the advantage that the data test circuit can readily cooperate with compatible external testing devices.

The test signal is advantageously contained as a pseudo-random bit pattern in the payload section of the frame. It is preferably a standardized test signal, particularly a test signal standardized according to CCITT Recommendation 0.151.2.1.

In a further preferred embodiment of the invention, the data test circuit and the circuit for executing the ASIC functions are synchronized to the beginning of a frame. To this end, the circuit for executing the ASIC functions advantageously comprises means for detecting the beginning of a frame and for generating a signal indicating the beginning of the frame. The data test circuit, in turn, comprises means for transferring the signal from the circuit for executing the ASIC functions to the data test circuit. This has the advantage that the data test circuit need not have any means for detecting the beginning of a frame but can utilize the means contained in the circuit for executing the ASIC functions for the detection of the beginning of a frame. This simplifies the construction of the data test circuit considerably.

In another preferred embodiment of the invention, the second means comprise an error counter that can be incremented upon detection of a bit error. Preferably, the error counter is incremented by one when the second means of the data test circuit detect a bit error. A bit error can occur for a variety of reasons. If the design of an integrated circuit is faulty, or the conductive paths of the integrated circuit are short-circuited, a large number of bit errors will be detected during the testing of the integrated circuit. If, however, the error counter indicates only one or two bit errors, this is an indication that it is not the design of the integrated circuit which is faulty, but that clock lines, for example, run too close to data lines or that the edges of the signals are not steep enough. Such faults result in a bit error only occasionally. The bit errors that occur can thus be classified by an error counter.

At the end of the test, the number of errors detected can be output. It is also possible, however, to output an error message only when the error counter has exceeded a given value. Furthermore, the test of the integrated circuit can be broken off when the error counter exceeds a given value.

In a further preferred embodiment, the data test circuit has a connecting line between the first means and the second means. This connecting line serves to enable the first means and the second means of the test circuit to perform a self-test.

In another preferred embodiment of the invention, the second means comprise means for generating a reference signal and means for comparing the received test signal with the reference signal. The reference signal is preferably identical with the test signal generated by the first means, i.e., the reference signal also has a frame structure. The reference signal is compared with the received test signal, which was passed through the circuit for executing the ASIC functions, through the entire integrated circuit, and/or through a superordinate circuit incorporating the integrated circuit. If the test signal differs from the reference signal, a bit error has been detected.

In a further preferred embodiment, the entire integrated circuit is implemented on a single semiconductor chip. Such a semiconductor chip can be incorporated into a superordinate circuit of a communication facility, e.g., of a transmitter or receiver unit, of a digital network like a conventional ASIC without the circuit having to be modified or adapted for this purpose.

A further object of the present invention is to improve a communication facility of the kind referred to at the beginning in such a way that external testing devices for testing the performance of the integrated circuits can be dispensed with.

To attain this object, the invention proposes to provide the communication facility with at least one integrated circuit as claimed in at least one of claims 1 to 18. The communication facility may, for instance, be a transmitter or receiver unit of the digital network.

A further object of the present invention is to improve a digital network of the kind referred to at the beginning in such a way that external testing devices for testing the performance of an integrated circuit of a communication facility can be dispensed with.

To attain this object, the invention proposes to provide at least one of the communication facilities of the digital network with at least one integrated circuit as claimed in at least one of claims 1 to 18.

BRIEF DESCRIPTION OF THE DRAWINGS

A preferred embodiment of the invention will now be explained in more detail with reference to the accompanying drawings, in which.

DETAILED DESCRIPTION OF THE INVENTION

Figure 1:
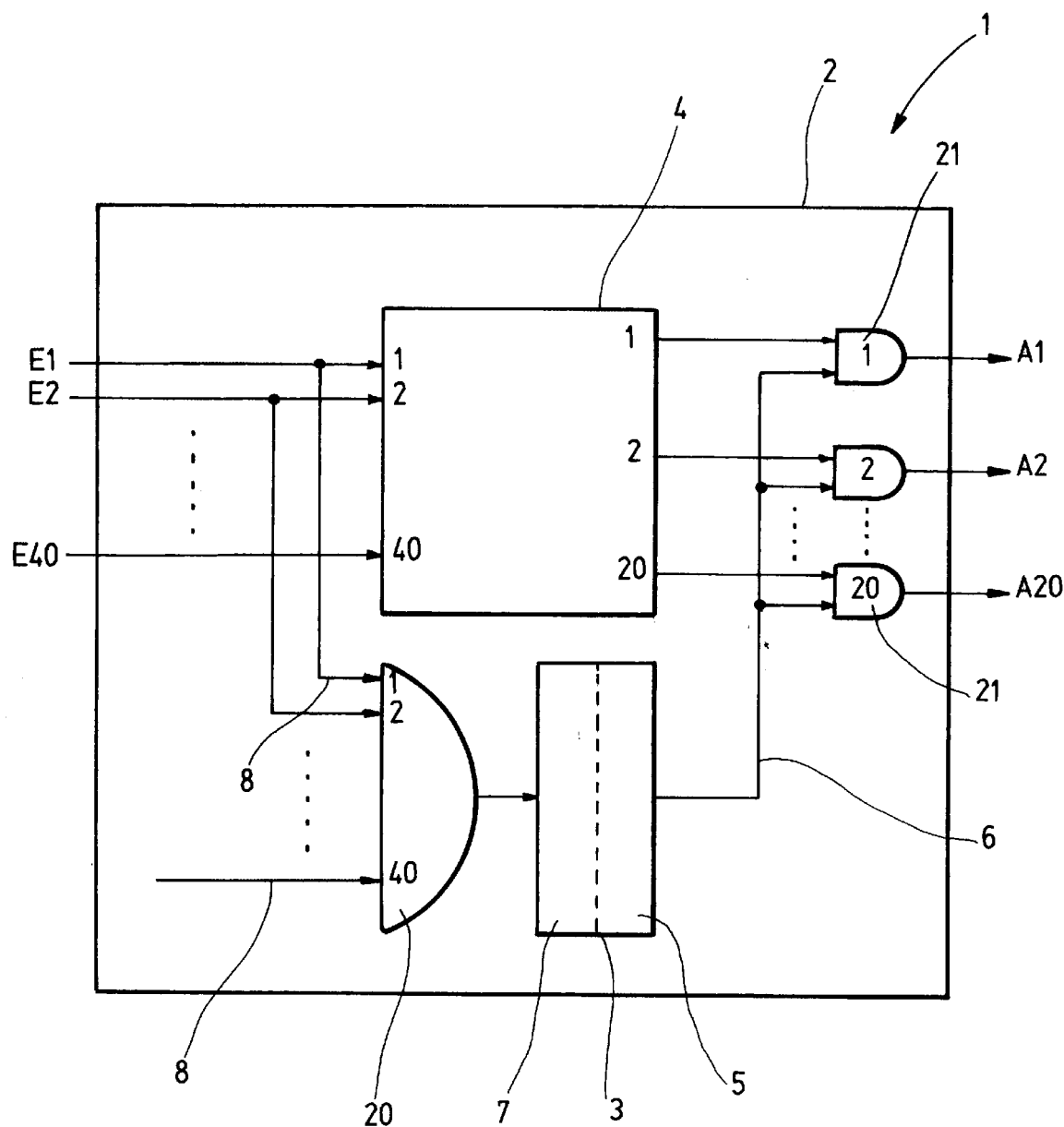
FIG. 1 shows a preferred embodiment of an integrated circuit in accordance with the invention.

Referring to FIG. 1, an application-specific integrated circuit in accordance with the invention is generally designated by reference numeral 1. The integrated circuit 1 in accordance with the invention is used in circuits of communication facilities (not shown) of digital networks. Communication facilities of the digital network are transmitting or receiving facilities, for example. The data signals to be transferred in the communication facilities are composed of frames. The frames correspond to the synchronous digital hierarchy (SDH) standard and have an overhead section, containing a frame word indicating the beginning of the frame, and a payload section, which contains the data signals to be transmitted.

The integrated circuit 1 is implemented on a single semiconductor chip 2. This semiconductor chip 2 is preferably compatible with conventional ASICs in terms of its dimensions and interfaces.

The integrated circuit 1 comprises a data test circuit 3 and a circuit 4 which performs the function proper of the application-specific integrated circuit 1 within the communication facility. The data test circuit 3 serves to test the performance of the circuit 4, of the entire integrated circuit 1, i.e., the circuit 4 and the data test circuit 3, and/or of a superordinate circuit of the communication facility that incorporates the integrated circuit 1. The data test circuit 3 comprises first means 5 for generating a test signal 6 and second means 7 for detecting bit errors in a received test signal 8.

The integrated circuit 1 includes a first multiplexer 20, whose inputs are connected to the inputs E1, E2, ..., E40 of the integrated circuit 1. The output of the multiplexer 20 is coupled to the second means 7 of the data test circuit 3. This makes it possible to switch from any of the inputs E1, E2, ..., E40 of the integrated circuit 1 to the data test circuit 3. The integrated circuit 1 includes a plurality of further multiplexers 21 which each have a first input connected to the first means 5 and a second input connected to the circuit 4. The outputs of the multiplexers 21 are connected to the outputs A1, A2, ..., A20, respectively, of the integrated circuit 1. This makes it possible to switch from any of the outputs of the circuit 4 to the output of the data test circuit 3 for any of the outputs A1, A2, ..., A20 of the integrated circuit 1.

Figure 2:
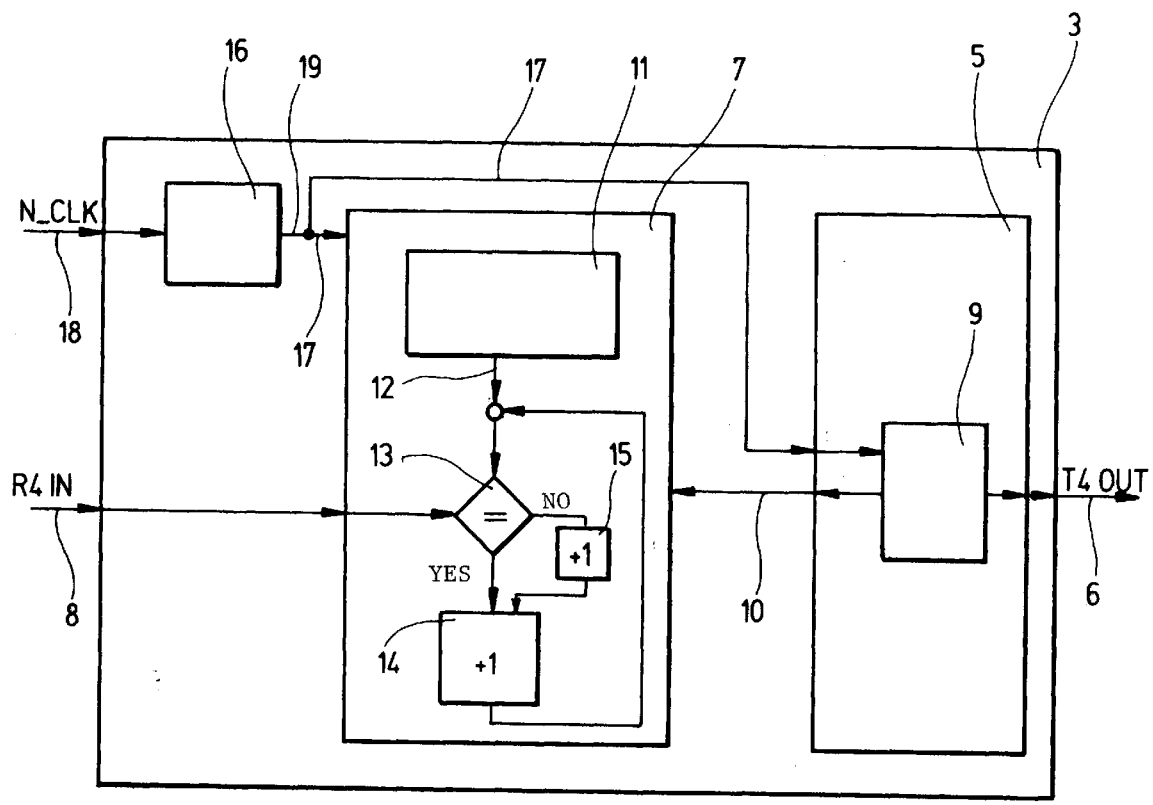
FIG. 2 shows a data test circuit of the integrated circuit of FIG. 1.

The operation of the integrated circuit 1 in accordance with the invention will now be explained in more detail with reference to FIG. 2. The first means 5 for generating the test signal 6 contain means for arranging the test signal 6 in the frames according to a pseudorandom bit pattern. The data test circuit 3 further includes a connecting line 10 between the first means 5 for generating the test signal 6 and the second means 7 for detecting bit errors. The connecting line 10 serves to enable the first means 5 and the second means 7 of the data test circuit 3 to perform a self-test.

The second means 7 for detecting bit errors comprise means 11 for generating a reference signal 12. The reference signal 12, too, has a frame structure and a pseudorandom bit pattern. The reference signal 12 is identical with the test signal 6. The second means 7 further include means 13 for comparing the reference signal 12 with the received test signal 8. If the reference signal 12 and the received test signal 8 match, i.e., in the absence of a bit error, a pointer 14 will be set to the next frame and the comparison will be repeated. If a bit error is present, however, an error counter 15 will be incremented by one before the next frames of the reference signal 12 and the test signal 8 are compared.

The data test circuit 3 further includes a timing device 16 with connecting lines 17 to the first means 5 and to the second means 7. The integrated circuit 1 receives a bit timing signal 8 from the superordinate circuit of the communication facility, and the timing device 16 contains means for converting the bit timing signal 18 to a byte timing signal 19.

What is claimed is:

1. An application-specific integrated circuit (ASIC) for use in communication facilities of a digital network in which a data signal to be transmitted is composed of frames, comprising:
   a circuit for executing the ASIC functions, and
   a data test circuit having:
      first means for generating a test signal composed of frames, and
      second means for detecting bit errors in a received test signal,
   wherein:
      the first means of the data test circuit is coupled to at least one output of the integrated circuit so as to allow the test signal to be output, and
      the integrated circuit further comprises a first multiplexer having its inputs coupled to the inputs of the integrated circuit so as to allow a test signal to be input, and having its output coupled to the second means of the data test circuit.

2. An integrated circuit as claimed in claim 1, wherein the second means of the data test circuit is connected to an input of the integrated circuit.

3. An integrated circuit as claimed in claim 1, wherein the integrated circuit further comprises a plurality of further multiplexers each having one input connected to the first means and another input connected to the output of the circuit for executing the ASIC functions and each having its output coupled to a respective one of the outputs of the integrated circuit.

4. An integrated circuit as claimed in claim 1, wherein the first means of the data test circuit is connected to at least one input of the circuit for executing the ASIC functions, and that the second means of the data test circuit is connected to at least one output of the circuit for executing the ASIC functions.

5. An integrated circuit as claimed in claim 1, wherein the data test circuit is synchronized with the circuit for executing the ASIC functions.

6. An integrated circuit as claimed in claim 1, wherein the frames of the data signal to be transmitted and of the test signal are structured according to the synchronous digital hierarchy standard and have an overhead section, containing a frame word indicating the beginning of a frame, and a payload section.

7. An integrated circuit as claimed in claim 6, wherein the test signal is contained as a pseudorandom bit pattern in the payload section of the frame.

8. An integrated circuit as claimed in claim 7, wherein the test signal is a standardized test signal.

9. An integrated circuit as claimed in claim 8, wherein the test signal is a signal standardized according to CCITT Recommendation 0.151.2.1.

10. An integrated circuit as claimed in claim 1, wherein the data test circuit and the circuit for executing the ASIC functions are synchronized to the beginning of a frame.

11. An integrated circuit as claimed in claim 10, wherein the circuit for executing the ASIC functions comprises means for detecting the beginning of a frame and for generating a signal indicating the beginning of the frame, and that the data test circuit comprises means for transferring the signal from the circuit for executing the ASIC functions to the data test circuit.

12. An integrated circuit as claimed in claim 1, wherein the second means comprise an error counter which can be incremented upon detection of a bit error.

13. An integrated circuit as claimed in claim 1, wherein the data test circuit comprises a connecting line between the first means and the second means.

14. An integrated circuit as claimed in claim 1, wherein the second means comprise means for generating a reference signal and means for comparing the received test signal with the reference signal.

15. An integrated circuit as claimed in claim 14, wherein the reference signal is identical with the test signal generated by the first means.

16. An integrated circuit as claimed in claim 1, wherein the entire integrated circuit is implemented on a single semiconductor chip.

17. A communication facility of a digital network in which a data signal to be transmitted is composed of frames, comprising a plurality of application-specific integrated circuits (ASICs), at least one said ASIC comprising:
   a circuit for executing the ASIC functions, and
   a data test circuit having:
      first means for generating a test signal composed of frames, and
      second means for detecting bit errors in a received test signal
   wherein:
      the first means of the data test circuit is coupled to at least one output of the integrated circuit so as to allow the test signal to be output, and
      the integrated circuit further comprises a first multiplexer having its inputs coupled to the inputs of the integrated circuit so as to allow a test signal to be input, and having its output coupled to the second means of the data test circuit.

18. A digital network in which a data signal to be transmitted is composed of frames, having communication facilities each comprising a plurality of application-specific integrated circuits (ASICs), at least one of the ASICs comprising:
   a circuit for executing the ASIC functions, and
   a data test circuit having:
      first means for generating a test signal composed of frames, and
      second means for detecting bit errors in a received test signal
   wherein:
      the first means of the data test circuit is coupled to at least one output of the integrated circuit so as to allow the test signal to be output, and
      the integrated circuit further comprises a first multiplexer having its inputs coupled to the inputs of the integrated circuit so as to allow a test signal to be input, and having its output coupled to the second means of the data test circuit.

* * * * *